(12) United States Patent
Brown et al.

(10) Patent No.: US 10,315,135 B2
(45) Date of Patent: Jun. 11, 2019

(54) QUICK DISCONNECT CONDUIT JOINT

(71) Applicant: Schier Products Company, Edwardsville, KS (US)

(72) Inventors: Benjamin F. Brown, Overland Park, KS (US); Todd E. Uhlenhake, Overland Park, KS (US); Martin B. Ismert, Prairie Village, KS (US); Charles M. Ismert, Kansas City, KS (US); Luke J. Ismert, Prairie Village, KS (US)

(73) Assignee: Schier Products Company, Edwardsville, KS (US)

( * ) Notice: Subject to any disclaimer, the term of this patent is extended or adjusted under 35 U.S.C. 154(b) by 380 days.

(21) Appl. No.: 15/085,852

(22) Filed: Mar. 30, 2016

(65) Prior Publication Data

US 2017/0284580 A1 Oct. 5, 2017

(51) Int. Cl.
| | |
|---|---|
| *B01D 17/00* | (2006.01) |
| *E03F 5/00* | (2006.01) |
| *E03C 1/126* | (2006.01) |
| *F16L 37/26* | (2006.01) |

(52) U.S. Cl.
CPC .............. *B01D 17/00* (2013.01); *E03C 1/126* (2013.01); *E03F 5/00* (2013.01); *F16L 37/26* (2013.01)

(58) Field of Classification Search
CPC .... B01D 17/00; E03F 5/00; E03C 1/26; F16L 37/26; Y10T 403/61
USPC .............................. 285/325, 319; 222/145.5
See application file for complete search history.

(56) References Cited

U.S. PATENT DOCUMENTS

| | | | |
|---|---|---|---|
| 7,481,321 B2 | 1/2009 | Ismert | |
| 2006/0252298 A1* | 11/2006 | Biddel | .................... F16L 37/26 |
| 2014/0073232 A1* | 3/2014 | Karas | ....................... F16L 37/26 |
| 2016/0059667 A1* | 3/2016 | Karas | ....................... F16L 37/26 |
| 2016/0355970 A1* | 12/2016 | Federico | ................. F16L 37/26 |

\* cited by examiner

*Primary Examiner* — Greg Binda
*Assistant Examiner* — Zachary T Dragicevich
(74) *Attorney, Agent, or Firm* — Hovey Williams LLP

(57) ABSTRACT

A conduit assembly of a gravity separation device having specialized joint structure for mating first and second conduits to permit easier removal of the first conduit. The first conduit may include a snout having a tube and a collar positioned at an end of the tube. The collar may include a flange extending outward from a center of the tube. The second conduit may have a main body and a saddle at an end of the main body. The saddle may include a track shaped to receive the flange of the collar of the first conduit. The saddle may also have a resiliently separable gateway comprising two opposing projections configured for receiving therebetween and partially enclosing the tube of the snout.

18 Claims, 8 Drawing Sheets

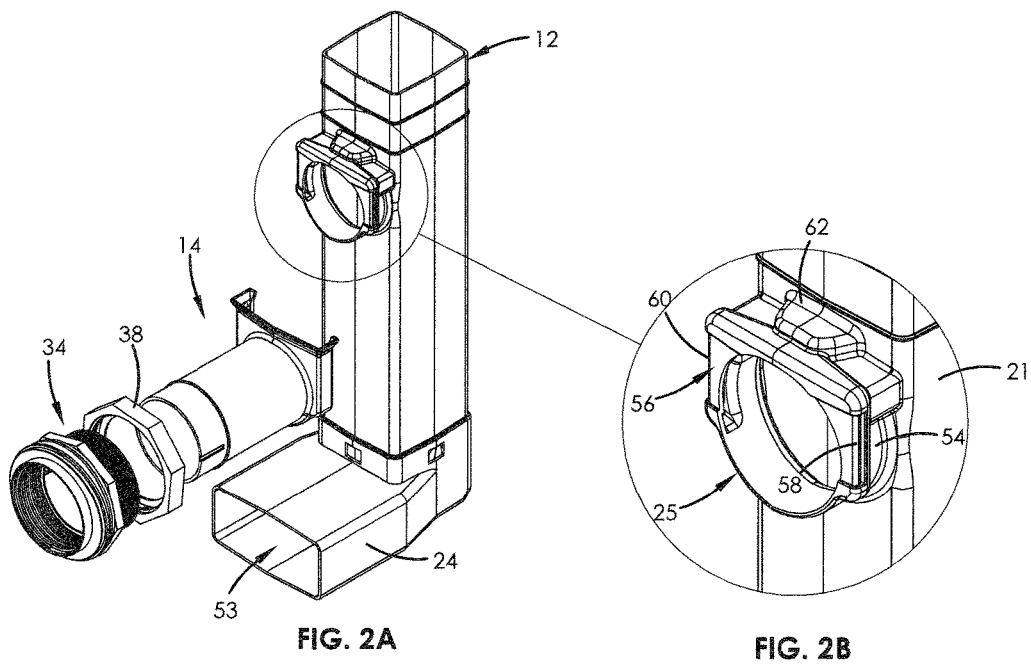

QUICK DISCONNECT CONDUIT JOINT

BACKGROUND OF THE INVENTION

1. Field of the Invention

The present inventive concept relates to systems and devices for treating flowable streams including one or more liquid component(s). The present inventive concept more particularly relates to an improved joint for conduits transporting streams to and from a separation compartment of a treatment system and/or device.

2. Discussion of Related Art

Effluent separation devices for separating water from solids, greases and the like are often designed to perform much of the separation process as the stream flows through a separation compartment. Effluent flow is commonly delivered to the separation compartment by an input conduit, and transported from the separation compartment by an output conduit. Typically, separation compartments are located at or below the ground-level of an area proximate to an effluent source, such as a kitchen sink. Maintenance of separation devices may require temporary removal of one or more conduit(s).

An advanced effluent treatment device is provided in U.S. Pat. No. 7,481,321, which is hereby incorporated herein by reference. Inlet and outlet conduits of the '321 Patent are connected to a separation chamber adjacent an aperture in the sidewall of the chamber using a coupling that extends through the aperture, illustrated in the figures. The coupling is configured to couple a first conduit length to a second conduit length (i.e., the "diffuser"), wherein the coupling includes a threaded portion located within the separation chamber. The unit further comprises a locking collar coupled to the diffuser and rotatable relative to the diffuser to threadably engage with the threaded portion of the coupling within the separation chamber to removably couple the diffuser to the coupling. The locking collar is meant to be rotated with respect to the diffuser and coupling such that the diffuser may be removed for cleaning or pressure testing. There is a need for an improved apparatus for removably coupling conduit(s) to treatment devices to, for example, ease the burden of cleaning and other maintenance.

This background discussion is intended to provide information related to the present inventive concept which is not necessarily prior art.

SUMMARY

Embodiments of the present inventive concept solve one or more of the above-described and other problems and limitations by providing an improved conduit assembly for a flowable stream treatment system or device.

According to one aspect of the present inventive concept, a conduit assembly of a gravity separation device is provided. The device may include a separation compartment defined in part by a sidewall. The conduit assembly may include a first conduit configured to be removably coupled to a second conduit, the second conduit being coupled to the sidewall. The first conduit may include a stem having a bottom segment defining an opening configured to provide fluid communication with the separation compartment. The first conduit may also include a snout having a substantially cylindrical duct spaced from the bottom segment and extending from the stem. The conduit assembly may include a second conduit having a main body that defines a hollow passage configured for fluid communication through the sidewall with an exterior of the compartment. The main body may also have a first end fixed to the sidewall and a second end characterized by a saddle configured for coupling with the first conduit. The saddle may include a resiliently separable gateway having two opposing projections configured for receiving therebetween and partially enclosing the duct of the snout.

A second aspect of the present inventive concept also concerns a conduit assembly of a gravity separation device, the device having a separation compartment defined at least partly by a sidewall. The conduit assembly may include a first conduit configured to be removably coupled to a second conduit, the second conduit being coupled to the sidewall. The first conduit may include a stem having a bottom segment defining an opening configured to provide fluid communication with the separation compartment. The first conduit may also include a snout having a duct spaced from the bottom segment and extending from the stem. The snout may also have a collar spaced from the stem. The conduit assembly may include a second conduit having a main body that defines a hollow passage configured for fluid communication through the sidewall with an exterior of the compartment. The main body may also have a first end fixed to the sidewall and a second end characterized by a saddle configured for coupling with the first conduit. The saddle may include a funnel and a track. The track may at least partly define a recessed cavity. The funnel may be configured to receive the collar of the snout and slidably transition the collar into the track and the recessed cavity.

In regard to a third aspect of the present inventive concept, a method of servicing a gravity separation device is provided. The method may include inserting a lift rod through an access port of the device. The method may also include engaging a conduit seated in a separation compartment of the device with the lift rod. The method may also include lifting the conduit from a snap-fit attachment to an adjacent conduit. The method may also include removing the conduit from the compartment via the access port using the lift rod.

This summary is provided to introduce a selection of concepts in a simplified form. These concepts are further described below in the detailed description of the preferred embodiments.

This summary is not intended to identify key features or essential features of the claimed subject matter, nor is it intended to be used to limit the scope of the claimed subject matter.

Various other aspects and advantages of the present inventive concept will be apparent from the following detailed description of the preferred embodiments and the accompanying drawing figures.

BRIEF DESCRIPTION OF THE DRAWING FIGURES

Preferred embodiments of the present inventive concept are described in detail below with reference to the attached drawing figures, wherein:

FIG. 2A is an elevated side perspective view of the disassembled first and second conduits of FIG. 1;

FIG. 2B is an enlarged sectional perspective view of a snout of the first conduit illustrated in FIG. 2A;

Figure 1A:
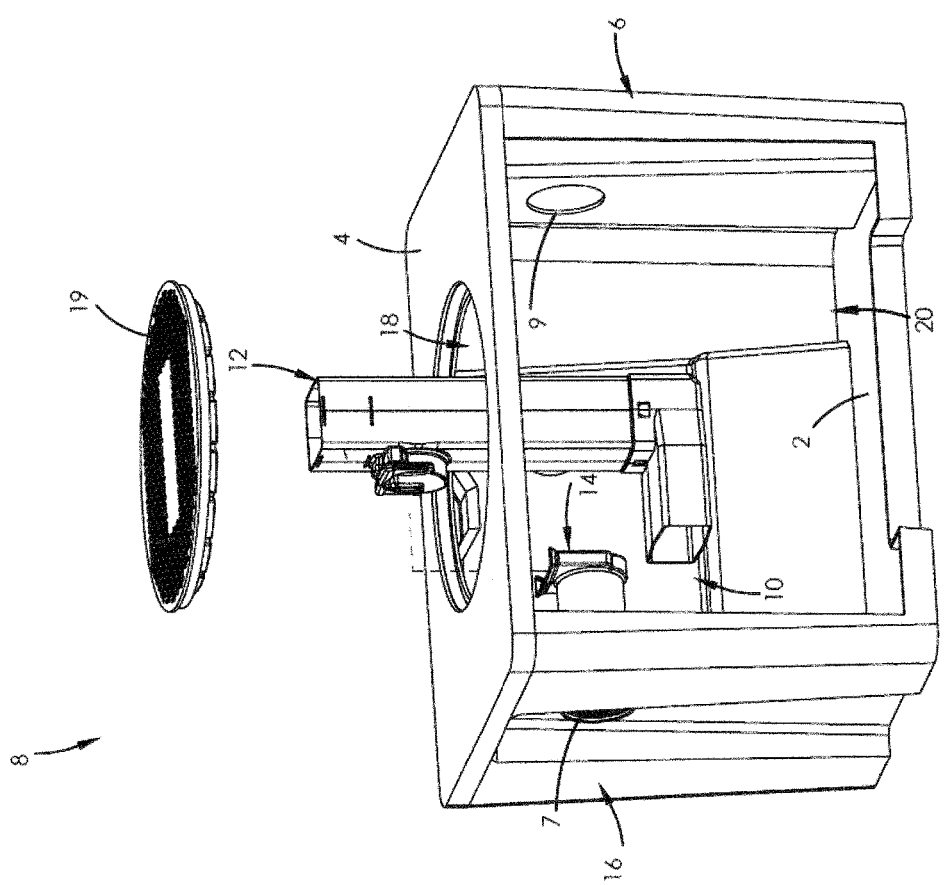
FIG. 1A is a partial, cross-sectional side view of a disassembled separation device constructed in accordance with an embodiment of the present inventive concept.

The drawing figures do not limit the present inventive concept to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present inventive concept is susceptible of embodiment in many different forms. While the drawings illustrate, and the specification describes, certain preferred embodiments of the invention, it is to be understood that such disclosure is by way of example only. There is no intent to limit the principles of the present inventive concept to the particular disclosed embodiments.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present inventive concept can include a variety of combinations and/or integrations of the embodiments described herein.

FIG. 1A illustrates a gravity separation device 8 that may be used for treating an effluent stream. Effluent streams may generally comprise water, lighter-than-water materials and/or heavier-than-water materials. The gravity separation device 8 is generally characterized as a container having a base 2, opposing ceiling portion 4, and a sidewall 6 that extends upwardly from the base 2 to the ceiling portion 4. The base 2, sidewall 6, and ceiling 4 cooperatively define a separation chamber 20 in the interior of the device 8. Sidewall 6 comprises a sidewall portion 16 that includes an inlet aperture 7 that extends through the sidewall portion 16 of the container 8 to provide communication between the exterior of the container 8 and the separation chamber 20. Sidewall 6 also includes an opposing outlet aperture 9 that extends through an opposing sidewall portion of the container 8 to provide communication between the exterior of the container 8 and the separation chamber 20.

Generally speaking, the effluent stream flows from an effluent source (not shown), through the inlet aperture 7, across the separation chamber 20 and out through the outlet aperture 9 that ultimately communicates the flow to an effluent drain such as a sewer (not shown). A gravity separation process occurs during the effluent stream's progression across the separation chamber 20. In the separation process one or more light components buoyantly migrate to a top layer near the water line. One or more heavy components sink to a bottom layer adjacent the base 2.

A preferred embodiment of the present inventive concept also includes flush and secure joints between conduits bearing effluent flowing into and/or out of the separation device 8, while at the same time permitting quick and easy removal of at least one conduit of the device 8. For instance, a conduit assembly 10 is configured to be affixed to sidewall portion 16 of the gravity separation device 8 to carry the incoming effluent stream into the separation chamber 20. Conduit assembly 10 includes a first conduit 12 configured to be detachably connected (aka removably coupled) to a second conduit 14. The first conduit 12 may be easily removed from the second conduit 14, preferably from an elevated position above the separation device 8, for cleaning, replacement and similar purposes.

For example, first conduit 12 may be prone to clogging by materials deposited by an effluent stream flowing through separation device 8. After a pre-determined period of time, maintenance on the device 8 may be conducted by simply lifting the first conduit 12 from its secured position in relation to the second conduit 14 and removing it from the separation device 8, while the second conduit 14 remains affixed to sidewall portion 16. In a preferred embodiment, first conduit 12 may be accessed through an access port 18, which may be covered by a lid 19 when not in use. A maintenance provider may manually engage and lift first conduit 12 from a snap-fit connection with second conduit 14 and remove it from the separation device 8. This represents a significant improvement on prior conduit designs for use with gravity separation devices, for example those designs that require prolonged removal and disassembly efforts on the part of maintenance providers. A preferred embodiment likewise improves the ease and efficiency of re-assembly of the first conduit 12 to the second conduit 14.

First conduit 12 is illustrated as a diffuser-style inlet conduit for carrying effluent from second conduit 14 to the separation compartment 20. The majority of gravity separation achieved by separation device 8 occurs as effluent flow travels across the separation compartment 20 between conduit assembly 10 and an outlet conduit (not shown). The outlet conduit will typically be located on the same (opposite) portion of sidewall 6 as outlet aperture 9 described in more detail above. The outlet conduit will typically be of similar construction as the inlet conduit, and therefore the inlet conduit is described in more detail herein with the understanding that its teachings are also applicable to the outlet conduit. It is further foreseen that the outlet conduit described above but not shown in the Figures may be of complimentary or different design from the inlet conduit described herein without departing from the spirit of the present inventive concept. It is still further foreseen that the outlet conduit may be of the construction described herein and attributed to an inlet conduit, while the inlet conduit may comprise a different design, without departing from the spirit of the present inventive concept.

Figures 1B, 1C:
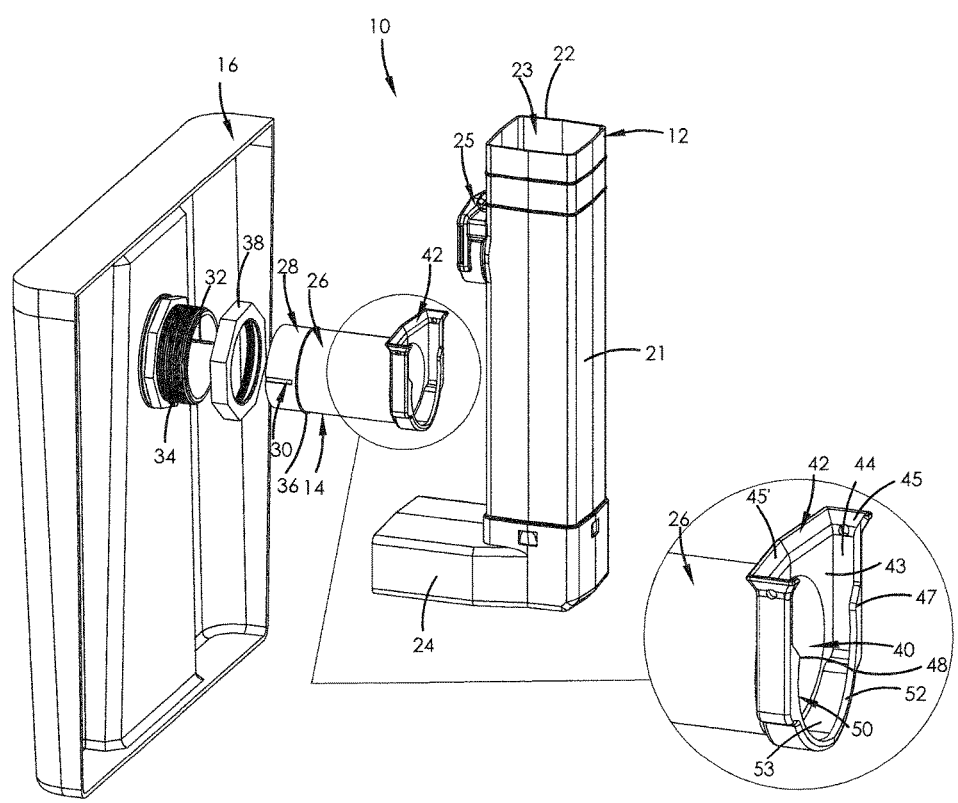
FIG. 1B is an elevated side perspective view of disassembled first and second conduits illustrated in FIG. 1A.
FIG. 1C is an enlarged sectional perspective view of a saddle of the second conduit illustrated in FIG. 1A.

Turning to FIG. 1B, first conduit 12 includes an elongated, vertically-oriented stem 21. The stem 21 body comprises a sidewall 22 defining a hollow passage 23 that vents to separation compartment 20. In the illustrated embodiment, the top of the stem 21 is characterized by the passage opening 23. In one or more embodiments, the stem body comprises a substantially rectangular cross-sectional shape. First conduit 12 also includes a bottom segment 24 distal from the top opening 23. Bottom segment 24 is attached to the stem 21 distal from the top opening 23 and directly adjacent the bottom terminus of the stem 21. Bottom segment 24 extends from the bottom terminus of the stem 21 in a direction that is substantially perpendicular to the direction of elongation of the stem 21. The bottom segment 24 is illustrated in FIG. 1B in a modern wide-mouth diffuser style. First conduit 12 also includes a snout 25 spaced from bottom segment 24 along the main body of stem 21, and adjacent the top opening 23. Snout 25 extends in a direction that is substantially perpendicular to the direction of elongation of the stem 21, and is depicted extending substantially in parallel with bottom segment 24.

It is foreseen that the shape and composition of stem 21, top opening 23, and bottom segment 24 may be substantially altered and/or optimized for various applications without departing from the spirit of the present inventive concept. For example, stem 21 may comprise a sidewall of different shape and/or be oriented differently with respect to sidewall portion 16; top 23 may define an opening of different size/shape or may have no opening at all; and/or bottom segment 24 may be shaped and/or sized differently and/or define an exit opening of different orientation, size and/or shape, without departing from the spirit of the present inventive concept.

Second conduit 14 includes an elongated main body 26 defining a hollow passage 40 and having a first end characterized by a coupling portion 28 for coupling with sidewall portion 16, and a second end characterized by a saddle 42 for coupling with the first conduit 14. Coupling portion 28 has two opposing recessed slots 30 (e.g., along its left and right sides) along its exterior surface to align with and receive corresponding protrusions or ribs 32 in a receiver 34. Receiver 34 is, in turn, affixed to and extends from sidewall portion 16 in alignment with the inlet aperture 7. In this manner, coupling portion 28 may be inserted and aligned in a telescoping movement within receiver 34 to prevent rotation of the second conduit 14 with respect to the receiver 34. Coupling portion 28 also includes a catch 36, comprising a rib radially extending from the outer surface of the main body 26, proximate to coupling portion 28. As coupling portion 28 is telescoped into position within receiver 34, catch 36 will prevent coupling portion 28 from moving too deeply into receiver 34. Once in position, coupling portion 28 is secured to receiver 34 using a nut 38. Nut 38 preferably has an inner diameter slightly smaller than an outer diameter of catch 36. Nut 38 may therefore abut catch 36, permitting coupling portion 28 to be coupled to receiver 34 as nut 38 is threadably received along an outer, threaded, surface of the receiver 34. In one or more embodiments, nut 38 is a threaded locking collar. The foregoing configuration permits the second conduit 14 to be removably coupled to the receiver 34 at the inlet.

It is foreseen that a variety of known structures may be employed to achieve alignment, proper insertion depth, and removable attachment between coupling portion 28 and receiver 34 and/or sidewall portion 16, without departing from the spirit of the present inventive concept, including without limitation those structures disclosed in U.S. Pat. No. 7,481,321, incorporated by reference herein to the extent not inconsistent with the present disclosure. In various embodiments, coupling portion 28 may simply be integral with sidewall portion 16; coupling portion 28 may alternatively utilize a snout/saddle arrangement according to the present inventive concept to attach to sidewall portion 16, preferably with a direction/vector of removal that is inverse with respect to a similarly configured joint between first and second conduits 12, 14; and/or coupling portion 28 may employ a variety of known fasteners for attachment to sidewall portion 16, without departing from the spirit of the present inventive concept. Likewise, receiver 34 itself may be integrally formed with sidewall portion 16, or may be removably affixed or permanently affixed thereto. Similarly, second conduit 14 may include a cross-sectional shape other than cylindrical, as illustrated.

Hollow passage 40 of the second conduit 14, when coupled to the receiver 34 and first conduit 12, provides fluid communication between first conduit 12 and an exterior of the separation compartment 20. The exterior may include a pipe conducting flow outside the separation compartment 20, may be an ambient environment, or may be anything else that is external to the compartment 20, without departing from the spirit of the present inventive concept.

Turning now to FIG. 1C, second conduit 14 includes a generally U-shaped saddle 42 on the end opposite from the coupling portion 28. Saddle 42 includes a generally U-shaped, recessed channel or track 44 defined along the inner diameter, and an end wall 43 circumscribing the opening to the hollow passage 40, which cooperates to receive and abut snout 25. As best viewed in FIG. 4B, the surface of track 44 is defined in part by an arcuate portion 53. The arcuate portion 53 terminates at a pair of ridges 57, from which extend a pair of generally upright arm portions 59. The arm portions 59 of the track are substantially planar and vertically-oriented such that they are configured for receiving and maintaining alignment with first and second straight edges of a collar of snout 25 (described below) when received in the track 44. However, it will be appreciated that the specific shape of the saddle and track 44 may be slightly modified, depending upon the shape of its corresponding snout. The terminal ends of each arm 59 comprise a slanted surface 45 like a funnel configured to receive snout 25 and guide it toward track 44. The end wall 43 further includes a slanted surface 45' that cooperates with each arm slanted surface 45 to form an inclined or slanted rim that is substantially continuous on three sides (corresponding to the track 44 and end wall 43), and defines an opening on a fourth side that is configured for receiving snout 25.

Figure 3A:
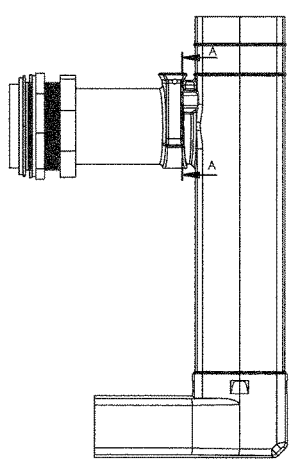
FIG. 3A is a side view of assembled first and second conduits illustrated in FIG. 1.
Figure 3B:
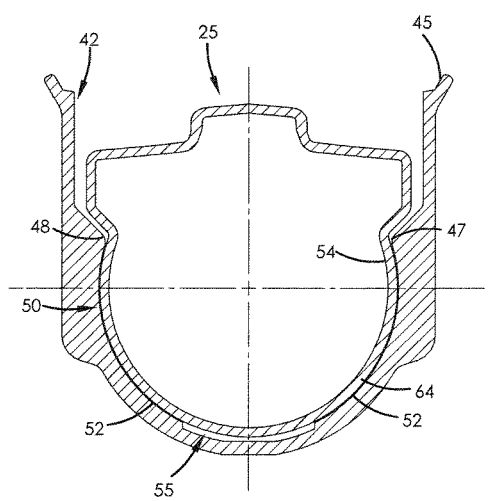
FIG. 3B is an enlarged cross-sectional view of portions of the saddle and snout that are revealed along line A-A, particularly illustrating detail regarding a semi-circular lip of the saddle having a seating surface receiving a bottom of the snout.

As best illustrated in FIG. 3B, the saddle 42 comprises a gateway comprising a lip 50 having a generally arcuate portion that terminates in two opposing projections 47, 48 configured to provide a snap-fit for receiving and removably securing first conduit 12. The lip 50 is spaced from the end wall 43, such that the lip 50, end wall 43, and interior surface of the track 44 cooperatively form a recessed cavity for receiving the snout 25. Lip 50 has a seating surface 52 configured to receive a bottom of snout 25, as will be described in greater detail below. As illustrated, opposing projections 47, 48 are integrally formed with lip 50. It is foreseen that projections 47, 48 may comprise retractable and/or spring-loaded structures, and/or may take alternative shapes and may project to a greater or lesser degree, without departing from the spirit of the present inventive concept.

Turning to FIG. 2A, disassembled first and second conduits 12, 14, receiver 34 and nut 38 are illustrated. Bottom segment 24 is illustrated in FIG. 2A in a modern wide-mouth diffuser style defining an opening 53 configured to provide fluid communication with separation compartment 20. FIG. 2B illustrates snout 25 in additional detail, which includes a substantially cylindrical conduit, pipe, or duct 54 extending substantially orthogonally from stem 21. Snout 25 also includes a collar 56 comprising a radially extending flange having left and right straight edges 58, 60, configured to be received by upright arm portions 59 of the saddle 42. Snout 25 also includes a crown 62 fixed to or integral with the top of duct 54. Crown 62 provides additional structural support for duct 54, and is preferably shaped to include a cavity or curved surface that may be manually grasped with fingers such that a maintenance provider may remove and/or re-assemble the first conduit 12 therewith.

Turning back to FIG. 3B, cross-sectional detail of the joint between snout 25 and saddle 42 is illustrated, with emphasis on the surfaces and shape of the gateway. More particularly, lip 50 is shown along with additional detail regarding the gateway including projections 47, 48. Projections 47, 48 together with the arcuate lip 50 provide a snap-fit around the arcuate outer perimeter of duct 54. Saddle 42, and more particularly lip 50, are preferably elastically deformable such that pressing snout 25 downward during the assembly process causes projections 47, 48 to move away from one another temporarily to permit snout 25 to pass therebetween. As a bottom 64 of duct 54 is received by seating surface 52, the projections 47, 48 rebound to their original positions and degree of separation from one another to at least partially enclose duct 54 and removably secure snout 25 to saddle 42. It is foreseen that varying portions of duct 54 may contact lip 50, that lip 50 may be removed entirely, and/or that the first conduit 12 may enter second conduit 14 from varying directional vectors, without departing from the spirit of the present inventive concept.

It is foreseen that the present inventive concept may be implemented in numerous devices experiencing non-pressurized flow across the conduit joints taught herein. However, the present inventive concept may also be implemented in devices experiencing pressurized flow across such joints, which is generally considered to increase the need for a better seal between conduits. Gasket pocket 55 may optionally provide an area in which to insert a gasket, silicone filling, or the like to form a more complete seal against effluent leakage. It is foreseen that alternative means of enhancing the seal(s) formed at such joint(s) may be used without departing from the spirit of the present inventive concept.

Figure 4A:
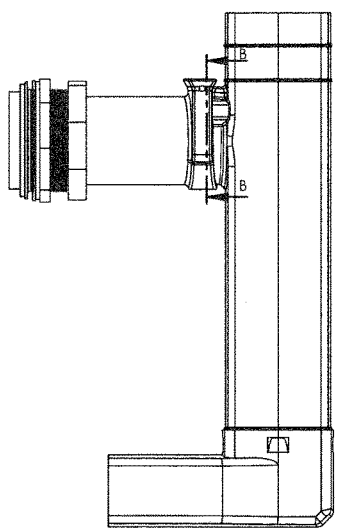
FIG. 4A is a side view of assembled first and second conduits illustrated in FIG. 1.
Figure 4B:
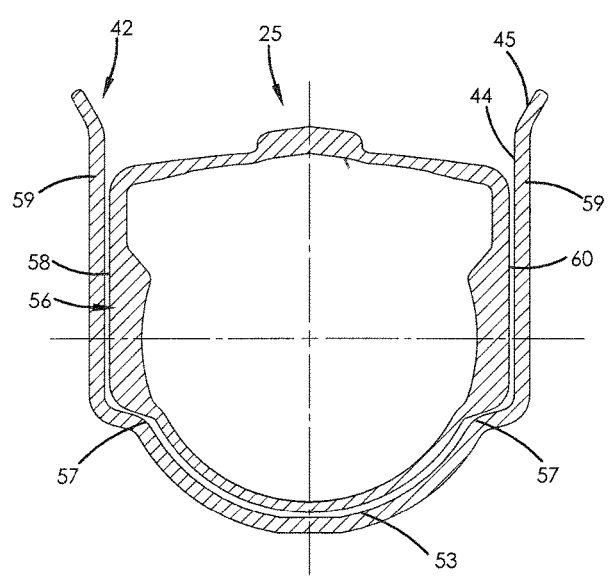
FIG. 4B is an enlarged cross-sectional view of portions of the saddle and snout that are revealed along line B-B (more distal from the stem than line A-A) and particularly illustrating detail regarding a flange of the snout's collar.

Turning now to FIG. 4B, cross-sectional detail of the joint between snout 25 and saddle 42 is illustrated along line B-B, with emphasis on the surfaces and shape of the recessed track 44 cavity. Line B-B is more distal from stem 21 than line A-A of FIG. 3B. Collar 56 and straight edges 58, 60 are shown in FIG. 4B aligned with and received within saddle 42 and, more specifically, track 44. It should be noted that collar 56 mates first and second conduits 12, 14 by substantially restricting side-to-side movement, including along straight edges 58, 60. It should further be noted with reference to FIGS. 1C and 3B that collar 56, in an assembled configuration, also restricts first conduit 12 from substantially separating from second conduit 14 by virtue of collar 56 being friction fit (e.g., wedged) between end wall 43 and lip 50 and its projections 47, 48. It is foreseen that the degree and location(s) of such wedging, and/or proximity of straight edges 58, 60 to track 44, may be varied along the conduit joint to alter the snugness and character of the snap-fit, without departing from the spirit of the present inventive concept.

Figure 5A:
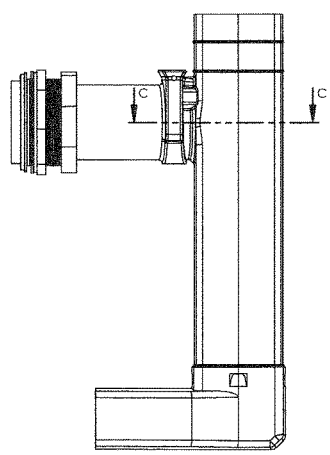
FIG. 5A is a side view of assembled first and second conduits illustrated in FIG. 1.
Figure 5B:
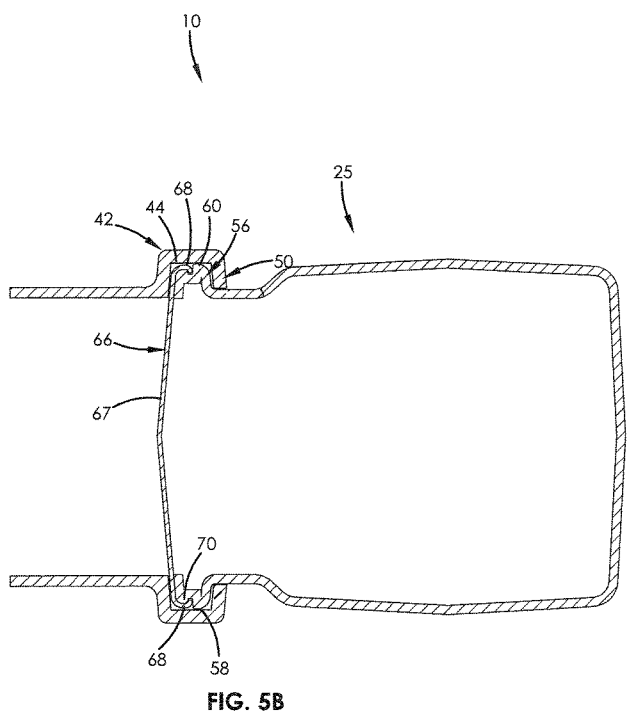
FIG. 5B is an enlarged cross-sectional top view of portions of the saddle and snout that are revealed along line C-C, particularly illustrating detail regarding the shape of the collar.

Turning now to FIG. 5B, cross-sectional detail of snout 25 and saddle 42 is illustrated from downward-looking angle along line C-C. A valve 66 is illustrated attached to snout 25. Valve 66 includes a simple main diaphragm or partition section 67, preferably including a flow control orifice (not shown). Valve 66 includes two hooks 68 on opposite (left and right) sides of the main partition 67 for snapping over and forming a seal with ridges 70 of collar 56. In this manner, flow control between first conduit 12 and second conduit 14 are provided. It is foreseen that alternative structures for controlling pressurized and/or un-pressurized flow, including restricted conduit sizing, etc. may be implemented without departing from the spirit of the present inventive concept.

Figures 6A, 6B:
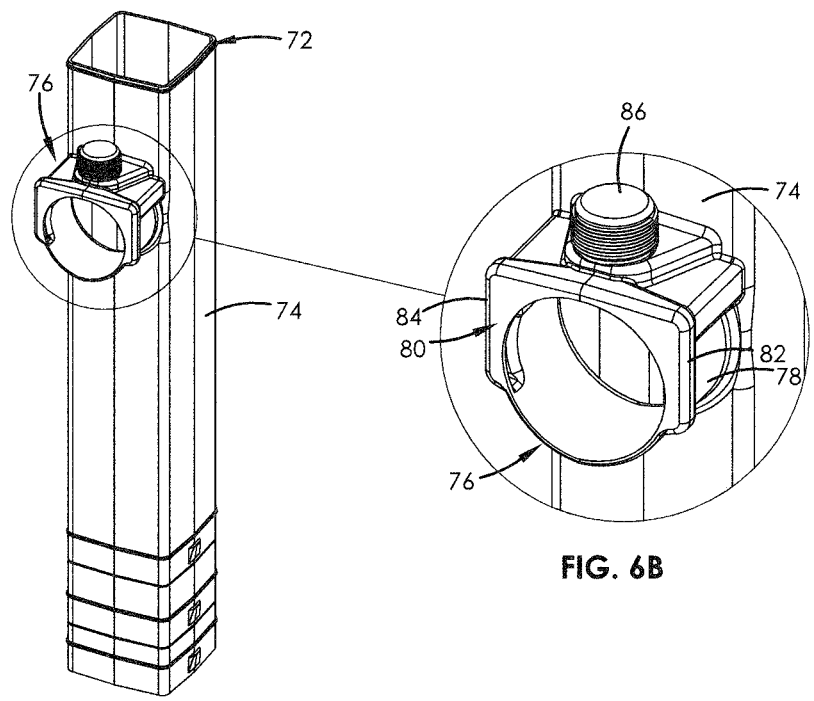
FIG. 6A is an elevated side perspective view of disassembled first and second conduits constructed in accordance with an embodiment of the present inventive concept.
FIG. 6B is an enlarged sectional perspective view of a snout of the first conduit illustrated in FIG. 6A, particularly illustrating detail regarding a lift lug of the snout.
Figure 6C:
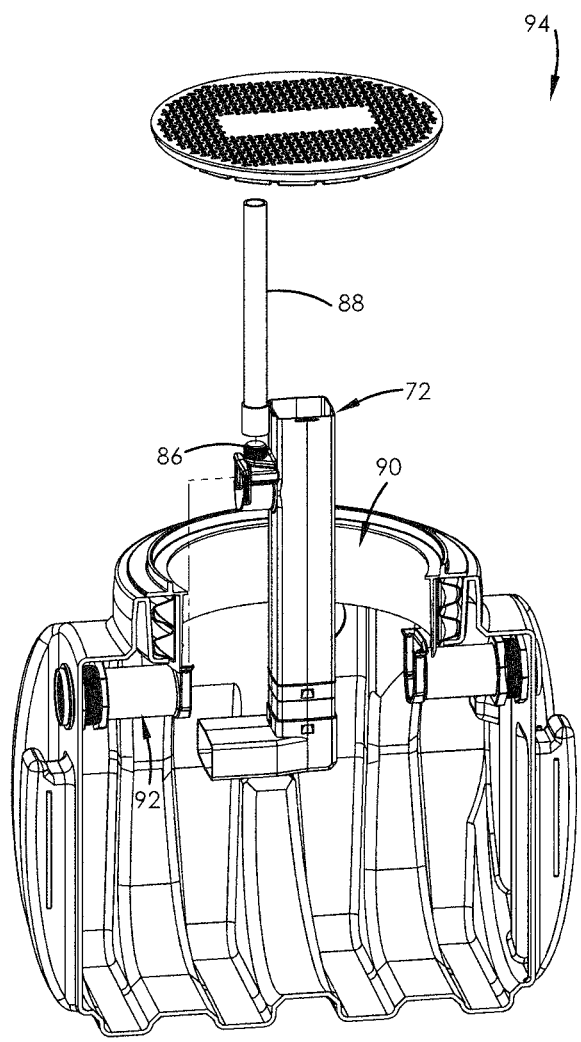
FIG. 6C is a cross-sectional side view of a separation device constructed in accordance with an embodiment of the present inventive concept, including a lifting device for use with the first conduit illustrated in FIG. 6A.

Turning now to FIG. 6B, a first conduit 72 according to an embodiment of the present inventive concept is illustrated in detail. First conduit 72 includes stem 74 and snout 76. Snout 76 includes a conduit 78 extending substantially orthogonally from stem 74. Snout 76 also includes a collar 80 comprising a flange having left and right straight edges 82, 84. Snout 76 also includes a crown 86. Crown 86 comprises a lift lug having a threaded outer periphery for receiving a lifting device or lift rod 88, an exemplary embodiment of which is illustrated in FIG. 6C. Lift rod 88 is illustrated as an NPT pipe with FPT coupling, and may have a 1.5″ diameter sized to be threaded over the lift lug of crown 86. It is foreseen that lift rod 88 may comprise different structures and means for engagement, as discussed below, without departing from the spirit of the present inventive concept. It is also foreseen that another lifting device not comprising a rod may be used, for example a strap, in embodiments where different structures are used to engage first conduit 72, without departing from the spirit of the present inventive concept.

As illustrated in FIG. 6C, where it is desired to lift first conduit 72 from a vertical distance, a maintenance provider may insert lift rod 88 through access port 90 and rotate lift rod 88 about crown 86 until the two are at least partially threaded together at the lift lug. The maintenance provider may then lift first conduit 72 from the snap-fit provided with a second conduit 92 and remove the first conduit 72 from separation device 94 via access port 90. It is foreseen that other structures for engaging the first conduit using a lift rod may be used, for example a simple hook formed at the end of the lift rod or other lifting device, without departing from the spirit of the present inventive concept.

Although the above description presents features of preferred embodiments of the present inventive concept, other preferred embodiments may also be created in keeping with the principles of the invention. Furthermore, these other preferred embodiments may in some instances be realized through a combination of features compatible for use together despite having been presented independently in the above description.

Furthermore, directional references (e.g., top, bottom, front, back, up, down, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45°) angle relative to the axis but, because the element extends at least in part along the axis, it should still be considered axial. Similarly, the terms radial, radially, and variations thereof shall be interpreted to mean the element has at least some directional component in the radial direction relative to the axis.

It is further noted that the term annular shall be interpreted to mean that the referenced object extends around a central opening so as to be generally toroidal or ring-shaped. It is not necessary for the object to be circular, nor does the object have to be continuous. Similarly, the term toroidal shall not be interpreted to mean that the object must be circular or continuous.

It should still further be noted that, in one construction, the separation device is molded from high density polyethylene to inhibit corrosion and leaking. In other constructions, the container can be formed from other suitable materials using any suitable method.

The preferred forms of the invention described above are to be used as illustration only and should not be utilized in a limiting sense in interpreting the scope of the present inventive concept. Obvious modifications to the exemplary embodiments, as hereinabove set forth, could be readily made by those skilled in the art without departing from the spirit of the present inventive concept.

The inventors hereby state their intent to rely on the Doctrine of Equivalents to determine and assess the reasonably fair scope of the present inventive concept as pertains to any apparatus not materially departing from but outside the literal scope of the invention set forth in the following claims.

The invention claimed is:

1. A gravity separation device comprising:
   a sidewall at least partly defining a separation compartment;
   a conduit assembly including—
      a first conduit removably coupled to a second conduit, said second conduit being coupled to said sidewall, said first conduit comprising—
         a stem having a bottom segment defining an opening providing fluid communication with said separation compartment;
         a snout comprising a substantially cylindrical duct spaced from said bottom segment and extending from said stem;
      said second conduit comprising—
         a main body defining a hollow passage configured for fluid communication through said sidewall with an exterior of the compartment, said main body comprising a first end fixed to said sidewall, and a second end characterized by a saddle coupled to said first conduit;
         said saddle comprising—
            a seating surface receiving a bottom of the duct,
            a resiliently separable gateway including two opposing projections configured for receiving therebetween and partially enclosing the duct of said snout between the two opposing projections and the seating surface in an assembled configuration,
   wherein movement of the first conduit away from the seating surface results in engagement between the first conduit and the second conduit that forces the two opposing projections apart for removal of the duct from the assembled configuration.

2. The gravity separation device of claim 1, wherein said second conduit is removably attached to the sidewall.

3. The gravity separation device of claim 2, wherein said second conduit is attached to the sidewall by a nut.

4. The gravity separation device of claim 3, wherein the nut is received along a receiver attached to the sidewall, said receiver having threading along an outer surface.

5. The gravity separation device of claim 1, wherein said second conduit is integral with said sidewall.

6. The gravity separation device of claim 1, wherein each of the two opposing projections forms an end of a substantially arcuate lip, the lip including the seating surface.

7. The gravity separation device of claim 1, wherein said saddle further comprises a funnel and a track at least partly defining a recessed cavity, said funnel being configured to receive the snout and slidably transition the snout into the track and the recessed cavity.

8. The gravity separation device of claim 7, wherein said snout further comprises a collar spaced from said stem, said collar including a radially extending flange.

9. The gravity separation device of claim 8, wherein:
   the flange of the collar includes substantially parallel first and second straight edges on opposite sides of the duct, and
   the track is at least partly defined by a pair of arms of the saddle, said track and arms being configured for receiving and maintaining alignment with the first and second straight edges of the collar.

10. The gravity separation device of claim 8, wherein the flange of the collar is configured to engage with the two opposing projections of the gateway to resist separation of the first conduit from the second conduit in an assembled configuration.

11. The gravity separation device of claim 7, wherein the funnel comprises an inclined rim of the saddle that is substantially continuous on three sides and defines an opening on a fourth side that is configured for receiving the duct.

12. The gravity separation device of claim 1, the snout further comprising a lift lug configured for attachment to a lift rod.

13. A gravity separation device comprising:
   a sidewall at least partly defining a separation compartment;
   a conduit assembly including—
      a first conduit removably coupled to a second conduit, said second conduit being coupled to said sidewall, said first conduit comprising—
         a stem having a bottom segment defining an opening providing fluid communication with said separation compartment;
         a snout including a duct spaced from said bottom segment and extending from said stem, said snout having a collar spaced from said stem;
      said second conduit comprising—
         a main body defining a hollow passage configured for fluid communication through said sidewall with an exterior of the compartment, said main body comprising a first end fixed to said sidewall, and a second end characterized by a saddle coupled to said first conduit;
         said saddle comprising a funnel and a track, said track at least partly defining a recessed cavity, said funnel being configured to receive the collar and slidably transition the collar into the track and the recessed cavity, wherein said funnel is substantially continuous on three sides and defines an opening on a fourth side that is configured for receiving the duct, said three sides respectively being inclined with respect to said track.

14. The gravity separation device of claim 13, wherein said duct is substantially cylindrical, said saddle further comprising a resiliently separable gateway including two opposing projections configured for receiving therebetween and partially enclosing the duct.

15. The gravity separation device of claim 14, wherein each of the two opposing projections forms an end of a substantially arcuate lip, the lip including a seating surface configured to receive a bottom of the duct.

16. The gravity separation device of claim 13, wherein:
the collar includes a radially extending flange having substantially parallel first and second straight edges on opposite sides of the duct, and
the track is at least partly defined by a pair of arms of the saddle, said track and arms being configured for receiving and maintaining alignment with the first and second straight edges of the collar.

17. The gravity separation device of claim 14, wherein the collar is configured to engage with the two opposing projections of the gateway to resist separation of the first conduit from the second conduit in an assembled configuration.

18. The gravity separation device of claim 13, wherein the funnel comprises a rim.

* * * * *